US009756166B2

(12) United States Patent
Cho et al.

(10) Patent No.: US 9,756,166 B2
(45) Date of Patent: Sep. 5, 2017

(54) MOBILE TERMINAL AND METHOD FOR CONTROLLING THE SAME

(71) Applicant: LG ELECTRONICS INC., Seoul (KR)

(72) Inventors: Sungil Cho, Seoul (KR); Junhee Yeo, Seoul (KR); Youngkyung Jung, Seoul (KR); Boram Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/464,136

(22) Filed: Aug. 20, 2014

(65) Prior Publication Data
US 2015/0229749 A1    Aug. 13, 2015

(30) Foreign Application Priority Data

Feb. 7, 2014    (KR) .................... 10-2014-0014367

(51) Int. Cl.
| | |
|---|---|
| H04B 1/38 | (2015.01) |
| H04M 1/725 | (2006.01) |
| H04M 19/04 | (2006.01) |
| H04M 1/60 | (2006.01) |

(52) U.S. Cl.
CPC ....... *H04M 1/7253* (2013.01); *H04M 19/048* (2013.01); *H04M 1/605* (2013.01); *H04M 1/6066* (2013.01)

(58) Field of Classification Search
CPC . H04M 19/048; H04M 1/6066; H04M 1/7253
USPC ....................................................... 455/566
See application file for complete search history.

(56) References Cited

U.S. PATENT DOCUMENTS

| | | | | |
|---|---|---|---|---|
| 7,769,353 | B2* | 8/2010 | Dietrich ............. | H04M 1/0202 455/550.1 |
| 2006/0114852 | A1 | 6/2006 | Levien et al. | |
| 2010/0057233 | A1* | 3/2010 | Suzuki ............. | H04W 52/0241 700/94 |
| 2012/0194976 | A1 | 8/2012 | Golko et al. | |
| 2013/0005310 | A1 | 1/2013 | Lim et al. | |
| 2013/0190055 | A1* | 7/2013 | Kulas ..................... | G06F 3/041 455/566 |

(Continued)

FOREIGN PATENT DOCUMENTS

| | | |
|---|---|---|
| KR | 10-2010-0124956 A | 11/2010 |
| KR | 10-2011-0006201 A | 1/2011 |

*Primary Examiner* — Wesley Kim
*Assistant Examiner* — Raj Chakraborty
(74) *Attorney, Agent, or Firm* — Birch, Stewart, Kolasch & Birch, LLP

(57) ABSTRACT

A mobile terminal and a method for controlling the same are provided. The mobile terminal includes a terminal body, a wireless communication unit configured to connect a wireless device to the terminal body to perform wireless communication with the terminal body, a sensing unit sensing that the terminal body approaches a user's head in a state in which a call for the terminal body is set to be connected to the external device through wireless communication, and a controller configured to, when it is determined that the terminal body has approached the user's head within a reference range according to the sensing results, control the wireless communication unit to transfer the call from the external device to the terminal body.

12 Claims, 16 Drawing Sheets

(56) References Cited

U.S. PATENT DOCUMENTS

2014/0266757 A1* 9/2014 Luna .................... G08B 21/18
340/686.6
2014/0354441 A1* 12/2014 Luna .................... H04W 4/008
340/686.6

* cited by examiner

FIG. 2
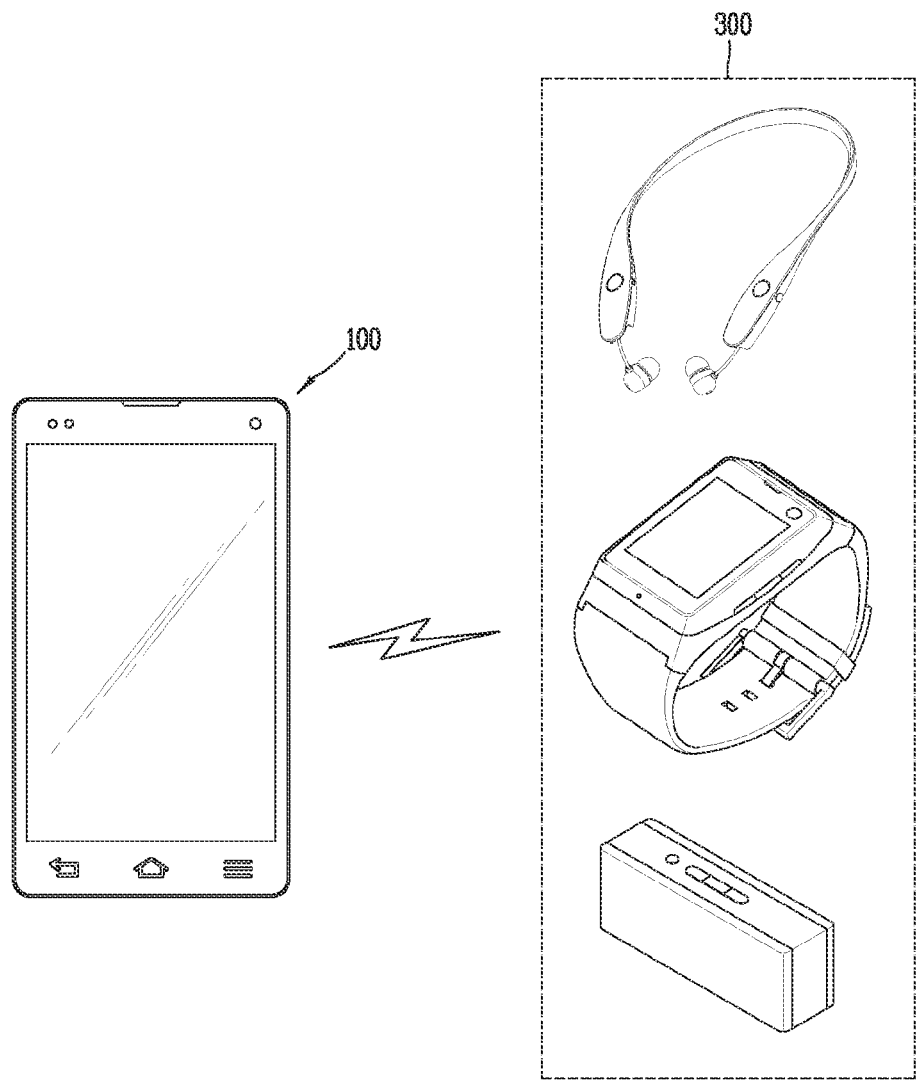
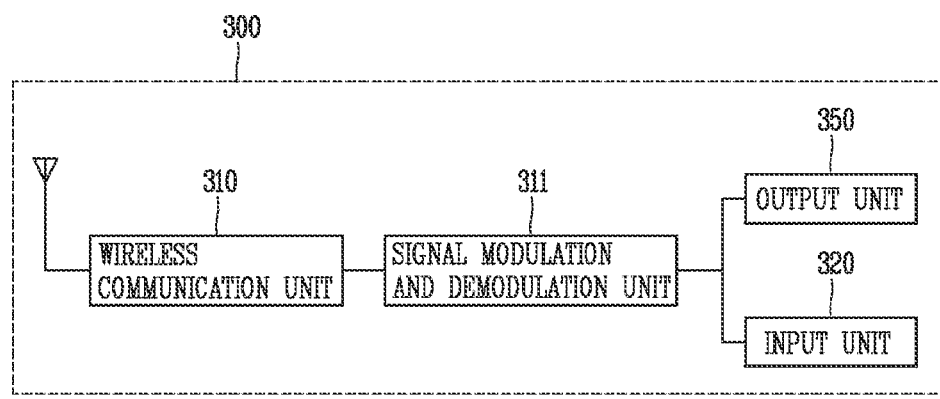

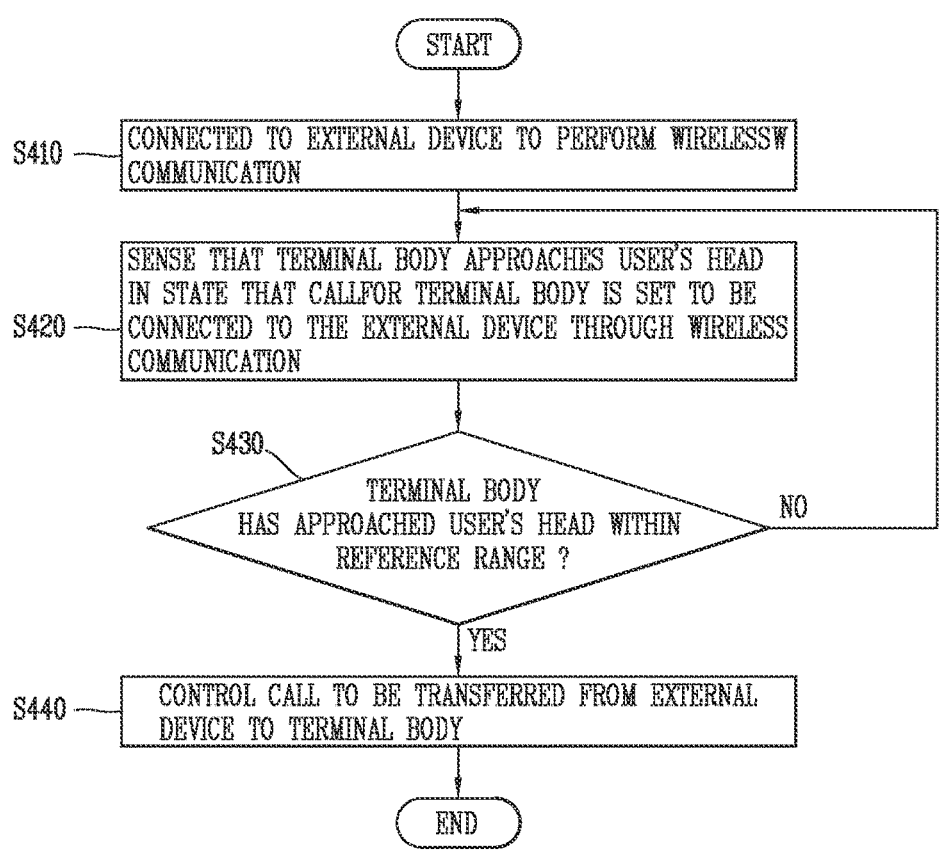

MOBILE TERMINAL AND METHOD FOR CONTROLLING THE SAME

CROSS-REFERENCE TO RELATED APPLICATIONS

This application claims priority to Korean Patent Application No. 10-2014-0014367 filed on Feb. 7, 2014 in Korea, the entire contents of which is hereby incorporated by reference in its entirety.

BACKGROUND OF THE DISCLOSURE

1. Field of the Disclosure

The present invention relates to a mobile terminal capable of performing wireless communication with at least one external device and a method for controlling the same.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Also, on the strength of the improvements, a terminal may perform wireless communication with a different terminal or an external device existing in a near field. For example, a terminal may perform Bluetooth communication by inquiring, pairing, or paging a different terminal existing in a near field.

Meanwhile, when a call is generated during wireless communication between terminals, the call is connected only through a pre-set device, for example, a Bluetooth device. Thus, if the call is intended to be connected through a device desired by a user, first, the user should halt the call and change a connection state. In particular, the user, forgetting that he or she is in wireless communication with other device, may habitually attempt a call through a device not connected for a call to feel dismay.

SUMMARY OF THE DISCLOSURE

Accordingly, an object of the present invention is to address the above-noted and other problems.

Another object of the present invention is to provide a mobile terminal capable of transferring a call according to a habitual gesture when the call is generated while the mobile terminal is wirelessly communicating with an external device, and a method for controlling the same.

Another object of the present invention is to provide a mobile terminal capable of automatically connecting a call to an external device in wireless communication, when a call which has been transferred is terminated, and a method for controlling the same.

To achieve these and other advantages and in accordance with the purpose of the present invention, as embodied and broadly described herein, the present invention provides in one aspect a mobile terminal including a terminal body; a wireless communication unit configured to connect a wireless device to the terminal body to perform wireless communication with the terminal body; a sensing unit sensing that the terminal body approaches a user's head in a state in which a call for the terminal body is set to be connected to the external device (or a call for the terminal body is set to be received by the external device) through wireless communication; and a controller configured to, when it is determined that the terminal body has approached the user's head within a reference range according to the sensing results, control the wireless communication unit to transfer the call from the external device to the terminal body.

In an exemplary embodiment of the present disclosure, the wireless communication may include at least one of Bluetooth communication and Wi-Fi communication.

In an exemplary embodiment of the present disclosure, after the call is transferred to the terminal body, when the call is terminated, the controller may control the wireless communication unit to connect a call to the external device (or the controller may control the wireless communication unit to enable the external device to receive a call).

In an exemplary embodiment of the present disclosure, the mobile terminal may further include a display unit configured to output a first icon representing a state of wireless communication between the terminal body and the external device, wherein when the call is transferred from the external device to the terminal body in a state in which the first icon is output, the controller may provide control such that a second icon corresponding to the transfer of the call is output to the display unit or the external device.

In an exemplary embodiment of the present disclosure, when the terminal body has approached to the user's head within the reference range according to the sensing results, the controller may provide control to transfer only the call to the terminal body, while maintaining the state of wireless communication between the external device and the terminal body, and control the wireless communication unit such that data, of the call, corresponding to the wireless communication is continuously output by the external device.

In an exemplary embodiment of the present disclosure, in a state in which the external device is set to be connected to the call or after the call is transferred from the external device to the terminal body, when wearing of the external device is not sensed for a pre-set period of time, the controller may release the connection between the terminal body and the external device.

In an exemplary embodiment of the present disclosure, the sensing unit senses that the terminal body approaches the user's head, on the basis of image information obtained through a camera.

In an exemplary embodiment of the present disclosure, the sensing unit senses that the terminal body approaches the user's head through a proximity sensor provided in the terminal body.

In an exemplary embodiment of the present disclosure, after the call was transferred from the external device to the terminal body, when a pre-set period of time has lapsed, the controller may release the connection between the terminal body and the external device.

In an exemplary embodiment of the present disclosure, in a state in which the call has been transferred from the external device to the terminal body, when it is sensed that the terminal body becomes away from the user's head, the controller may control the wireless communication unit such that the call is transferred back from the terminal body to the external device.

In an exemplary embodiment of the present disclosure, when the call is transferred from the external device to the terminal body, the controller may control the output unit to output first vibration, and after the first vibration is output, when the call is transferred back from the terminal body to the external device, the controller may control the output unit to output second vibration.

In an exemplary embodiment of the present disclosure, when the terminal body becomes gradually away from the user's head beyond the reference range according to the sensing results, the controller may adjust a magnitude of an audio signal corresponding to the call output to the external device on the basis of the increased distance.

In an exemplary embodiment of the present disclosure, when the terminal body becomes gradually away from the user's head beyond the reference range according to the sensing results, the controller may gradually increase a magnitude of an audio signal corresponding to the call output to the external device, in proportion to the increased distance.

In an exemplary embodiment of the present disclosure, the call is classified into a call in a call mode and a call in a call standby mode according to whether a call is connected, and when the call is transferred to the terminal body in the call mode and the call is terminated, the controller may maintain the state in which the external device is set to be connected to a call, and when the call is transferred to the terminal body in the call standby mode and the call is terminated, the controller may control the wireless communication unit to release the state in which the external device is set to be connected to a call.

In an exemplary embodiment of the present disclosure, the sensing unit may sense whether the terminal body approaches the user's head after the call is connected to the external device, and when the terminal body has approached the user's head within the reference range during the call according to the sensing results, the controller may provide control such that the connected call is immediately transferred from the external device to the terminal body.

To achieve these and other advantages and in accordance with the purpose of the present invention, as embodied and broadly described herein, the present invention provides in another aspect a method for controlling a mobile terminal, including: connecting a terminal body and an external device such that the terminal body and the external device perform wireless communication; in a state in which a call for the terminal body is set to be connected to the external device through wireless communication, sensing that the terminal body approaches a user's head; and when the terminal body has approached to the user's head within a reference range, providing control such that the call is transferred from the external device to the terminal body.

In an exemplary embodiment of the present disclosure, the wireless communication may include at least one of Bluetooth communication and Wi-Fi communication.

In an exemplary embodiment of the present disclosure, the method may further include: after the call is transferred to the terminal body, sensing termination of the call; and when the call is terminated, providing control such that a call is connected to the external device.

In an exemplary embodiment of the present disclosure, the controlling may include: when the terminal body has approached the user's head within the reference range, providing control such that only the call is transferred to the terminal body, while maintaining the state of wireless communication between the external device and the terminal body; and providing control such that data, of the call, corresponding to the wireless communication is continuously output by the external device.

In an exemplary embodiment of the present disclosure, the method may further include: after the call is transferred to the terminal body, sensing that the terminal body becomes away from the user's head; and when the terminal body becomes away from the user's head beyond the reference range, providing control such that a call is connected by the external device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 2 is a view illustrating an example in which a mobile terminal related to the present disclosure wirelessly communicates with an external device;

FIG. 4 is a flow chart illustrating a method for controlling a mobile terminal according to an exemplary embodiment of the present disclosure;

DETAILED DESCRIPTION OF THE PREFERRED EMBODIMENTS

Figure 1A:
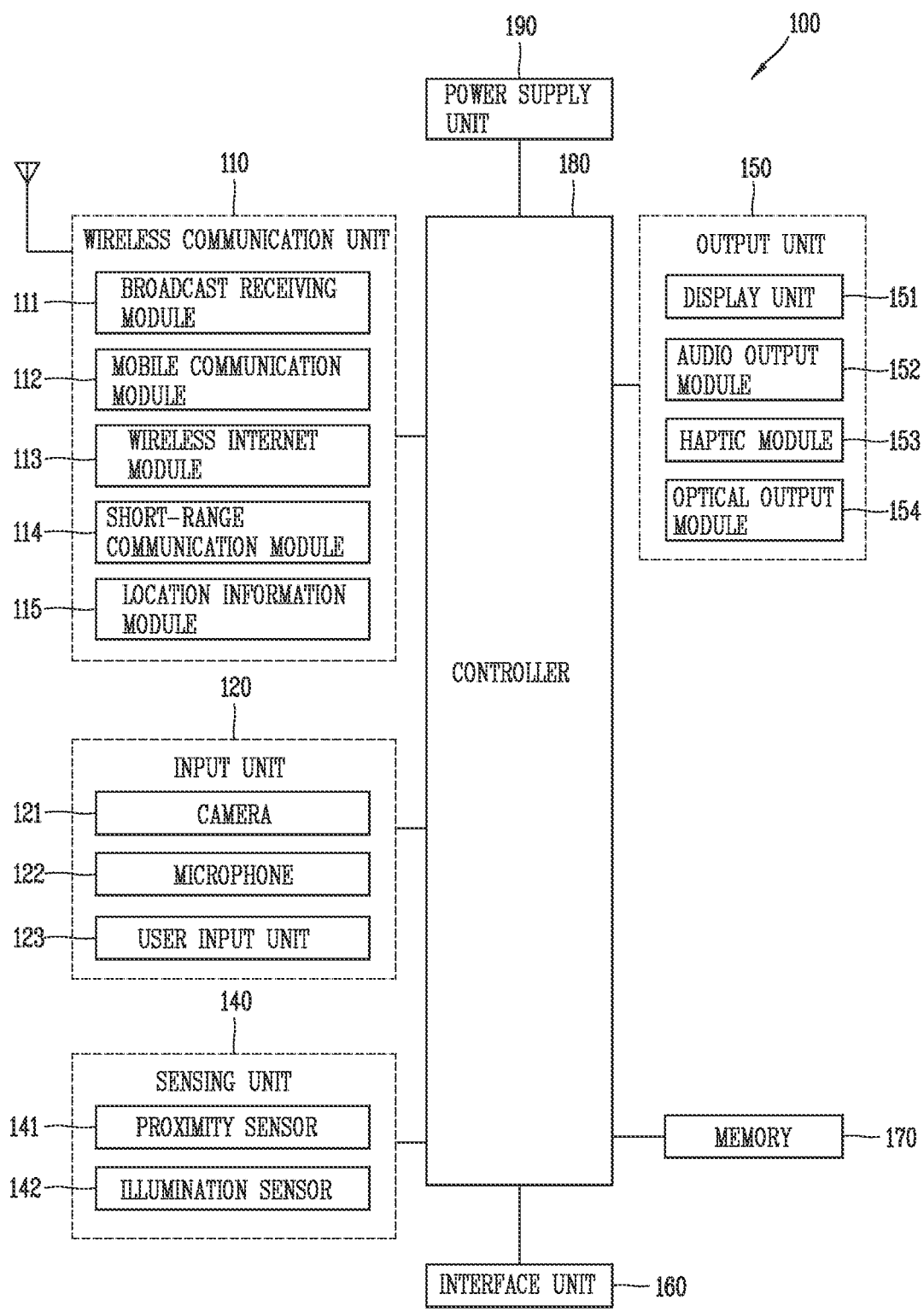
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
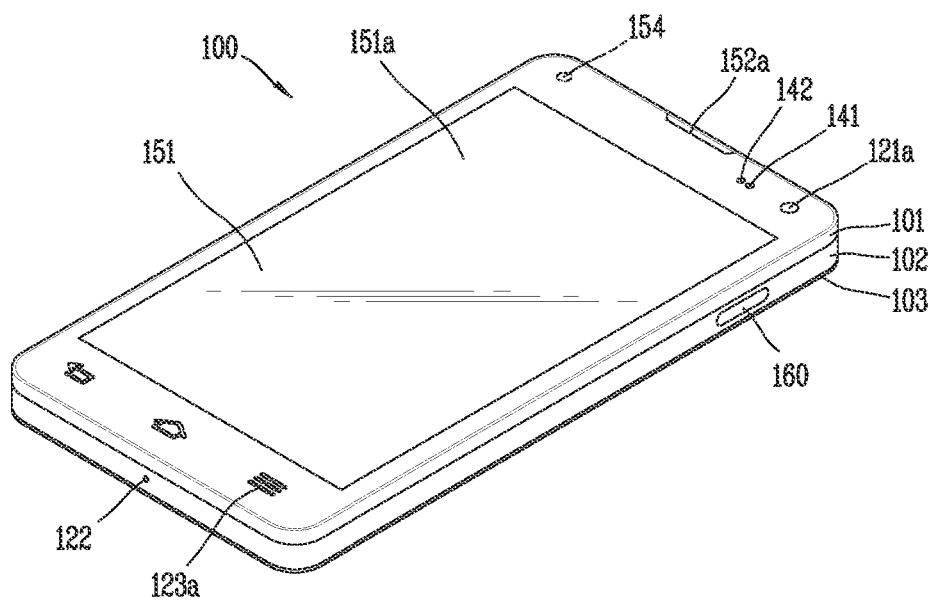
FIGS. 1B and 1C are conceptual views of one example of the mobile terminal, viewed from different directions.
Figure 1C:
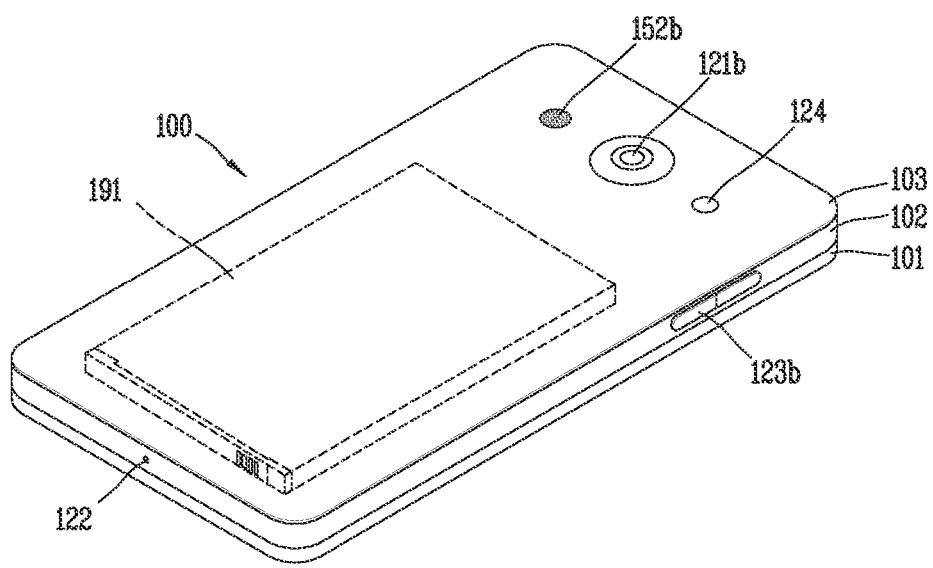

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output unit 152, a haptic module 153, and an light output unit 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output unit 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output unit 152 can provide audible output related to a particular function (e.g., a call signal reception sound, a message reception sound, etc.) performed by the mobile terminal 100. The audio output unit 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An light output unit 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the light output unit 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output unit 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, first and second audio output units 152a and 152b, the proximity sensor 141, an illumination sensor 142, a light output unit 154, first and second cameras 121a and 121b, first and second manipulation units 123a and 123b, a microphone 122, an interface unit 160, and the like.

Hereinafter, as illustrated in FIGS. 1B and 1C, the mobile terminal 100 in which the display unit 151, the first audio output unit 152a, the proximity sensor 141, the illumination sensor 142, the light output unit 154, the first camera 121a, and the first manipulation unit 123a are disposed on a front surface of the terminal body, the second manipulation unit 123b, the microphone 122, and the interface unit 160 are disposed on the side of the terminal body, and the second audio output unit 152b and the second camera 121b are disposed on a rear surface of the terminal body will be described as an example.

However, the components are not limited to the configuration. The components may be excluded, replaced, or disposed on other surfaces as needed. For example, the first manipulation unit 123a may not be provided on the front surface of the terminal body, and the second audio output unit 152b may be provided on the side of the terminal body, rather than on the rear surface of the terminal body.

The display unit 151 may display (or output) information processed in the mobile terminal 100. For example, the display unit 151 may display executed screen information of an application program driven in the mobile terminal 100, or user interface (UI) information or graphic user interface (GUI) information according to the executed screen information.

The display unit 151 may include a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver and the second audio output unit 152b may be implemented in the form of a loud speaker to output voice audio, alarm sounds, multimedia audio reproduction, and the like.

The window 151a of the display unit 151 will typically include an aperture to permit audio generated by the first audio output unit 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The light output unit 154 can be configured to output light for indicating an event generation. Examples of such events include a message reception, a call signal reception, a missed call, an alarm, a schedule notice, an email reception, information reception through an application, and the like. When a user has checked a generated event, the controller can control the light output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output units 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output units 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. However, the present disclosure is not limited thereto and a position of the rear input unit may be modified.

When the rear input unit is provided on the rear surface of the terminal body, a new user interface may be implemented. Also, when the touch screen or the rear input unit as described above replaces at least some functions of the first manipulation unit 123a provided on the front surface of the terminal body so the first manipulation unit 123a is omitted from the front surface of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output unit 152b can be located on the terminal body. The second audio output unit 152b may implement stereophonic sound functions in conjunction with the first audio output unit 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Hereinafter, exemplary embodiments related to a control method that may be implemented in the mobile terminal configured as described above will be described with reference to the drawings. It is obvious to a person skilled in the art that the present disclosure may be embodied to any other particular forms within the scope of the spirits and essential characteristics of the present disclosure.

FIG. 2 is a view illustrating an example in which a mobile terminal related to the present disclosure wirelessly communicates with an external device.

As illustrated in FIG. 2, the mobile terminal 100 may be connected to an external device 300 such that the mobile terminal 100 may perform communication with the external device 300 wirelessly. Here, the wireless communication may be any one of mobile communication, wireless Internet communication, and near field communication. Also, in a case in which the wireless communication is a near field communication, the near field communication may be any one of Bluetooth communication, radio frequency identification (RFID), Wi-Fi communication, infrared data association (IrDA), ultra wide band (UWB) communication, and ZigBee communication.

Hereinafter, it is assumed that the wireless communication is Bluetooth communication or Wi-Fi communication. However, the present disclosure is not limited thereto and the external device 300 may be any electronic device capable of performing Bluetooth communication or Wi-Fi communication. For example, the external device 300 may be Bluetooth headset, another mobile terminal of a counterpart, a printer, and the like (not limited thereto).

The external device 300 may include a wireless communication unit 310, a signal modulation and demodulation unit 311, an output unit (for example, a speaker) 350, and an input unit (for example, a microphone) 320.

The wireless communication unit 310 may allow the external device 300 to communicate near field communication with the mobile terminal 100 according to a corresponding communication standard. Also, the signal modulation and demodulation unit 311 may demodulate a signal received from the mobile terminal 100 through wireless communication or modulate a signal to be transmitted to the mobile terminal 100. Also, the output unit 350 may output audio corresponding to the demodulated signal, and the input unit 320 may receive audio from the user. Meanwhile, the external device 300 may include components identical to or similar to those of the mobile terminal 100.

Figure 3:
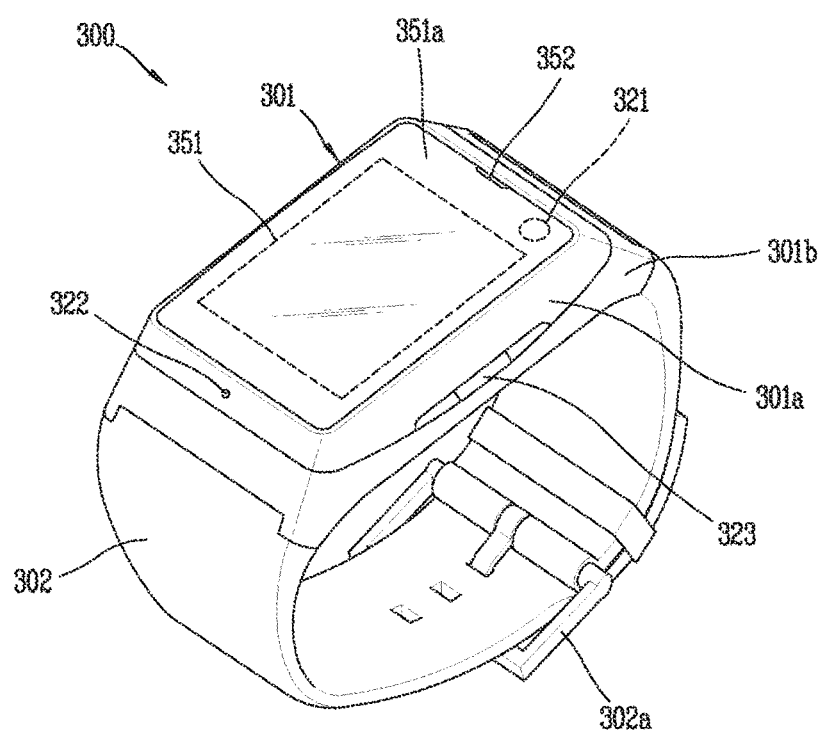
FIG. 3 is a block diagram illustrating an example of the external device wirelessly communicating with the mobile terminal related to the present disclosure.

FIG. 3 is a perspective view illustrating one example of a watch-type external device 300 wirelessly communicating with the mobile terminal 100 in accordance with an exemplary embodiment. As illustrated in FIG. 3, the watch-type external device 300 includes a main body 301 with a display unit 351 and a band 302 connected to the main body 301 so as to be wearable on a user wrist. In general, the external device 300 may be configured to include features that are the same or similar to those of the mobile terminal 100 of FIGS. 1A to 1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type external device 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output unit 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

The mobile terminal 100 according to an exemplary embodiment of the present disclosure including at least one of the components as described above may be connected to the external device 300 as described above through the wireless communication unit 110. Also, in a state in which a call for a terminal body is set to be connected to an external device through wireless communication, the sensing unit 140 of the mobile terminal 100 may sense that the body of the mobile terminal 100 approaches a user's head. Here, the terminal body approaching the user's head refers to a user making a gesture of bringing the mobile terminal 100 toward his or her head where user's ear, mouse, and the like, are positioned to perform call communication.

In a case in which the body of the mobile terminal 100 has approached the user's head within a reference range according to the sensing results, the controller 180 of the mobile terminal 100 provides control such that the call set to be connected to the external device is immediately transferred to the body of the mobile terminal 100.

Accordingly, although the user forgets the fact that a call for the mobile terminal 100 has been set to be connected through the external device 300, when the user performs making his or her habitual gesture, for example, when the user brings the mobile terminal 100 closer to his or her head, the call may be naturally transferred to the mobile terminal 100 from the external device 300.

Hereinafter, a method for transferring a connection of a call in the mobile terminal according to an exemplary embodiment of the present disclosure will be described in detail with reference to FIGS. 4 and 5A through 5D. FIG. 4 is a flow chart illustrating a method for controlling a mobile terminal according to an exemplary embodiment of the present disclosure, and FIGS. 5A through 5D are conceptual views illustrating the flow chart of FIG. 4.

First, as illustrated in FIG. 4, the mobile terminal according to an exemplary embodiment of the present disclosure is connected to at least one external device so as to perform wireless communication therewith in step S410. Accordingly, the mobile terminal 100 may perform near field communication, for example, Bluetooth communication or Wi-Fi communication, with the external device 300.

Here, the external device 300 may include any electronic device capable of performing a voice call function and transmitting and receiving various data. Also, as illustrated in FIG. 5, the external device 300 may be a watch type mobile terminal 300, but the present disclosure is not limited thereto and the external device 300 may include any electronic device available for Bluetooth communication or Wi-Fi communication.

For example, the external device 300 may be a Bluetooth device formed to be worn on a particular portion of a human body such as a headset, a Bluetooth earphone, or the like. In this case, the mobile terminal 100 may sense that the external device 300 is worn on the user's body, on the basis of a wireless signal or a biometric signal received through the wireless communication unit 110.

Figure 5A:
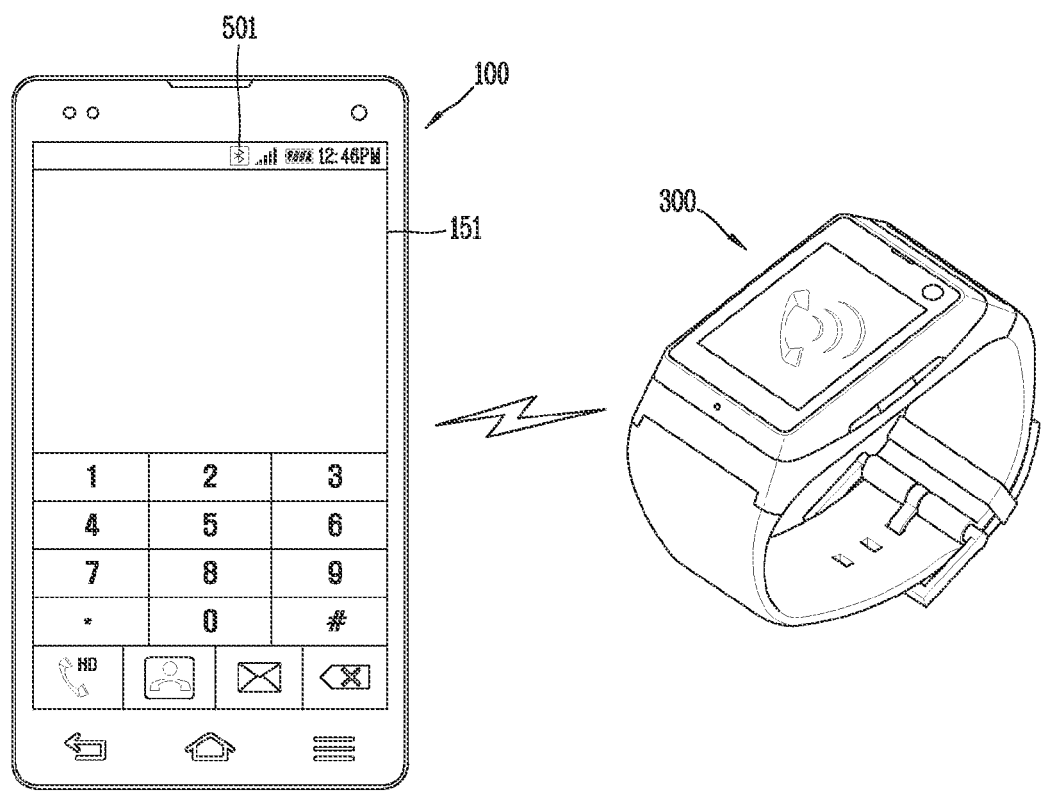
FIGS. 5A through 5D are conceptual views illustrating the flow chart of FIG. 4.
Figure 5B:
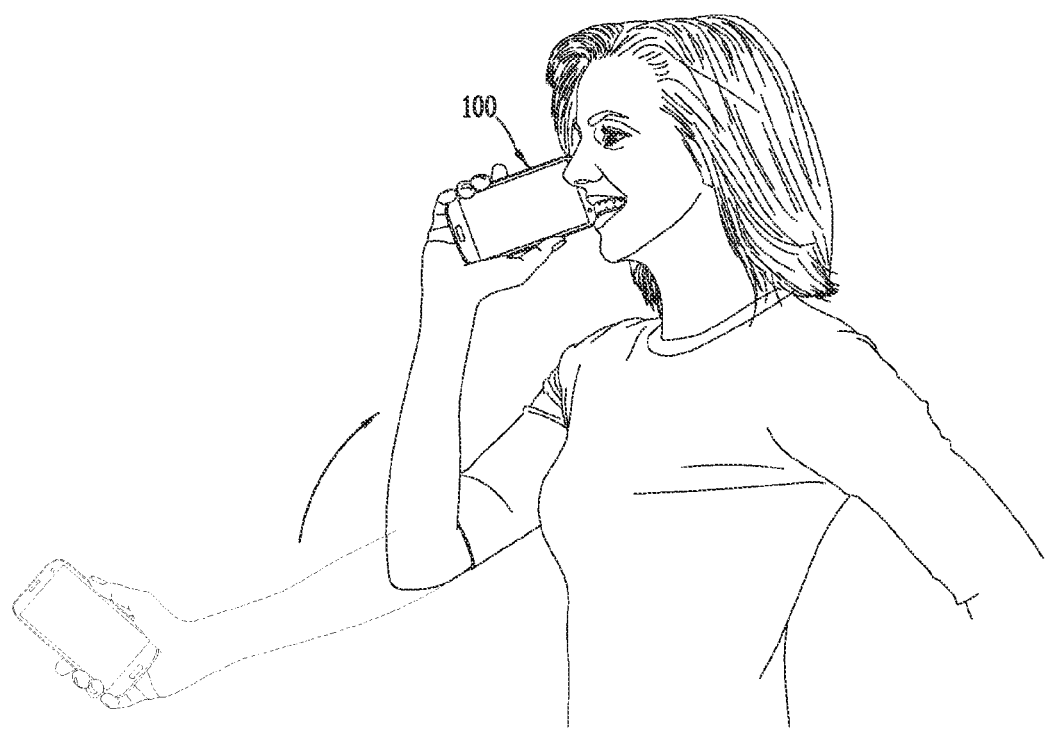

In this manner, when the body of the mobile terminal 100 and the external device 300 are connected to perform wireless communication, the controller 180 may output a first icon representing a state of wireless communication to a region of the display unit 151. In this case, as illustrated in FIG. 5A, the first icon may be an image representing a type of wireless communication, for example, an image representing Bluetooth connection. Also, although not shown, the first icon may be a thumbnail image representing a type and an operation of the external device 300 that wireless communicates with the mobile terminal 100.

Meanwhile, when a call for the mobile terminal 100 is set to be connected to the external device 300 through wireless communication, the sensing unit 140 of the mobile terminal 100 may sense that the terminal body approaches the user's head in step S420.

Here, setting a call such that it is connected to the external device 300 refers to that a call is terminated and originated through the external device 300 that communicates wirelessly with the mobile terminal 100.

Also, here, setting of a call for the body of the mobile terminal 100 such that it is connected to the external device 300 may be set to be automatically performed when wireless communication is connected with the body of the mobile terminal 100 or may be set through user manipulation with respect to the mobile terminal 100 or the external device 300.

For example, when the user manipulates the mobile terminal 100 so as to be automatically connected with an adjacent Bluetooth device, a communication procedure such as inquiry, paring, paging, or the like, may be performed to attempt connection of wireless communication between the mobile terminal 100 and the external device 300, and when wireless communication is connected, a call for the mobile terminal 100 may be automatically set to be connected to the external device 300.

Also, here, approaching of the body of the mobile terminal 100 close to the user's head is a concept including a user making a habitual gesture of attempting a voice call (or a video call).

In detail, a user's habitual gesture of attempting a voice call may include, for example, a motion of bringing the mobile terminal 100 close to his or her ear, a motion of bringing the microphone 122 provided in the mobile terminal 100 close to his or her mouth, or a motion of applying a touch to the display unit 151 of the mobile terminal 100 or to a particular key of the mobile terminal 100. Also, a user's habitual gesture of attempting a video call may include, for example, a motion of placing the display unit 151 of the mobile terminal 100 such that the display unit 151 faces the user face by a predetermined distance.

To this end, the sensing unit 14 may sense that the body of the mobile terminal 100 approaches the user's head, on the basis of image information obtained through the camera 121 of the mobile terminal 100. For example, when a user contact applied to the body of the mobile terminal 100 is sensed, the controller 180 may activate the camera 121 of the mobile terminal 100 and recognize that the body of the mobile terminal 100 approaches the user's head, on the basis of image information obtained through the activated camera 121.

Also, the sensing unit 140 may sense that the body of the mobile terminal 100 approaches the user's head, through the proximity sensor 141 provided in the body of the mobile terminal 100. For example, the proximity sensor 141 may sense that the body of the mobile terminal 100 has approached the user's head, upon sensing a change in an electric field as the mobile terminal 100 is close to the user's head.

Also, the controller 180 may further recognize whether the user lifts the body of the mobile terminal 100 with his or her right hand or left hand, on the basis of a sensor value of a mobile sensed through a gyro sensor unit (not shown) of the sensing unit 140, namely, on the basis of graph patterns formed by an x axis, y axis, and z axis. In this manner, in the case in which left hand and right hand are set to be distinguished, the controller 180 may provide control such that a call may be transferred to the mobile terminal 100 only when the user lifts the mobile terminal 100 through a particular hand.

Also, when the sensing unit 140 senses that a call is being terminated to or originated from the external device 300 and a touch input is applied to a region of the display unit 151 or to a predetermined key (or a particular key) provided in the terminal of the mobile terminal, the sensing unit 140 may sense that the body of the mobile terminal approaches the user's head.

Also, the sensing unit 140 may sense that the body of the mobile terminal approaches the user's head by combining image information obtained through the camera 121 as described above, distance information obtained through the proximity sensor 141, information of a touch input, other voice information, and the like.

When the body of the mobile terminal 100 has approached the user's head within a reference range according to the sensing results in step S430, the controller 180 may provide control such that the call for the terminal body is transferred from the external device 300 to the terminal body in step S440.

Here, transferring of the call from the external device 300 to the terminal body refers to that a function of terminating or originating a call for the terminal body has been set to be executed by the external device 300 that wirelessly communicates with the terminal body, but such a function of terminating or originating a call is transferred back to the mobile terminal 100 from the external device 300 without a user manipulation.

Also, the transferring of a call may be performed when termination or origination of a call is in a connection standby state or when a call is connected and voice communication is being performed (or video call is being performed). In this manner, when a call is transferred, voice according to a ring back tone and/or a call is output through the mobile terminal 100 to which a call has been transferred.

Also, the controller 180 may first determine that the mobile terminal 100 has approached the user's head on the basis of information received through the sensing unit 140, and secondly determines whether a pre-set voice, for example, a voice such as "hello?" or "connect!", has been input to the microphone 122, and transfer the call from the external device 300 to the mobile terminal.

In this case, the transfer of the call may be performed regardless of signal strength of wireless communication between the mobile terminal 100 and the external device 300. Namely, even in a case in which a state of wireless communication between the mobile terminal 100 and the external device 300 is good and signal strength is strong, when a user's habitual gesture is sensed, the call may be transferred.

Also, the controller 180 may determine whether the body of the mobile terminal 100 has approached the user's head within the reference range, for example, within a range sufficient for recognizing a proximity touch, by analyzing data sensed through the sensing unit 140.

Thus, the controller 180 may determine a point in time at which the mobile terminal 100 has approached the user's head within a predetermined range as a point in time at which the call is to be transferred. Also, when a point in time at which the call is to be transferred is determined, the controller 180 may output a sound corresponding to release of a call connection to the external device 300.

Also, in a case in which the call has been transferred through the user's habitual gesture, the controller 180 may change a communication channel in use. In detail, when a call is sensed by the external device 300 during wireless communication between the mobile terminal 100 and the external device 300, the controller 180 transmits and receives a voice signal through a first communication channel. Subsequently, when the terminal body has approached the user's head within the reference range during the call communication, the controller 180 may provide control such that the mobile terminal 100 transmits and receives a voice signal through a second communication channel different from the first communication channel.

Also, when the body of the mobile terminal 100 has approached the user's head within the reference range, the controller 180 may provide control such that only the call is transferred to the terminal body, while maintaining a state of wireless communication between the external device 300 and the mobile terminal 100.

Accordingly, during the call communication, the controller 180 may provide control such that data corresponding to the wireless communication between the mobile terminal 100 and the external device 300 is continuously output by the external device 300. For example, while particular content stored in the mobile terminal 100 is being downloaded to the external device 300, although a call is transferred from the external device 300 to the mobile terminal 100, the controller 180 may provide control such that the previously executed function, namely, downloading, may not be interrupted (or suspended or stopped).

Also, in another exemplary embodiment, the controller 180 may provide control such that transmission of a portion of data corresponding to wireless communication between the mobile terminal 100 and the external device 300 is interrupted while transmission of another portion of the data is continued, on the basis of pre-set priority, while maintaining a state of wireless communication between the external device 300.

Namely, in case of a function which has been set to have high priority, the controller 180 may provide control such that an operation corresponding to the function is continuously performed by the external device 300, although the call is transferred. For example, after a call is transferred, when an instant message is received, the controller 180 may provide control such that the corresponding message is output by the external device 300, rather than by the mobile terminal 100.

In contrast, in case of a function which has been set to have low priority, when a call is transferred, the controller may provide control such that an operation corresponding to the function in the external device is interrupted until when the call is terminated. For example, in a case in which a call is transferred from the external device 300 to the mobile terminal 100 while particular content stored in the mobile terminal 100 is being played or streamed by the external device 300, the playing or streaming operation may be suspended until when the call is terminated. Setting of priority may be performed by manipulating the mobile terminal 100 by the user, for example, by setting or changing priority in a setting mode.

Also, in a state in which an icon corresponding to wireless communication with the external device 300 is output to a region of the display unit 151, when a call is transferred from the external device 300 to the body of the mobile terminal 100, the controller 180 may output alarm corresponding to the transfer.

Figure 5C:
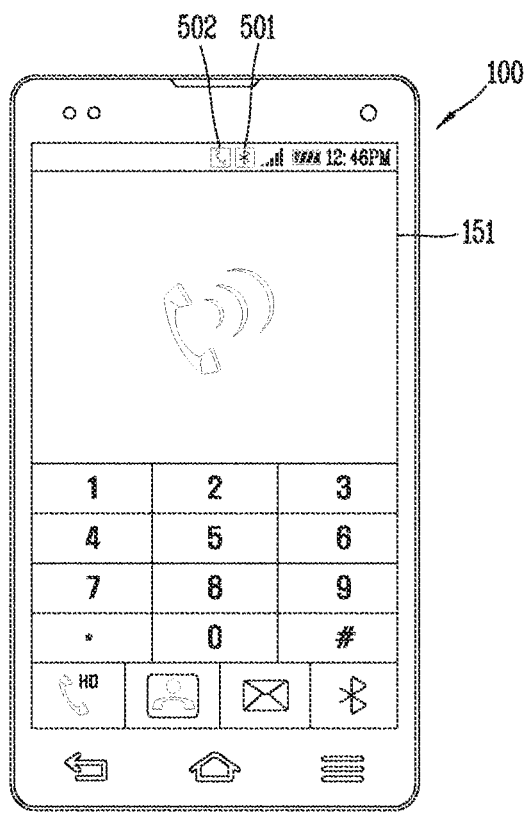

In this case, the alarm may output in the form of at least one of vibration, sound, and a message. For example, when a call is transferred from the external device 300 to the body of the mobile terminal 100, as illustrated in FIG. 5C, the controller 180 may output an icon (hereinafter, referred to as a 'second icon') 502 corresponding to the transfer of the call to a region of the display unit 151, for example, a status bar region. In this case, the controller 180 may also output to the status bar region an icon (hereinafter, referred to as a 'first icon') 501 representing that the state of wireless communication between the external device 180 and the mobile terminal 100 is maintained.

Also, after the call is transferred from the external device 300 to the mobile terminal 100, when the corresponding call is terminated, the controller 180 may provide control such that a call is connected to the external device. Namely, without any other manipulation, the controller may provided control such that termination or origination of a call is connected through the external device 300 that wireless communicates with the mobile terminal 100.

Figure 5D:
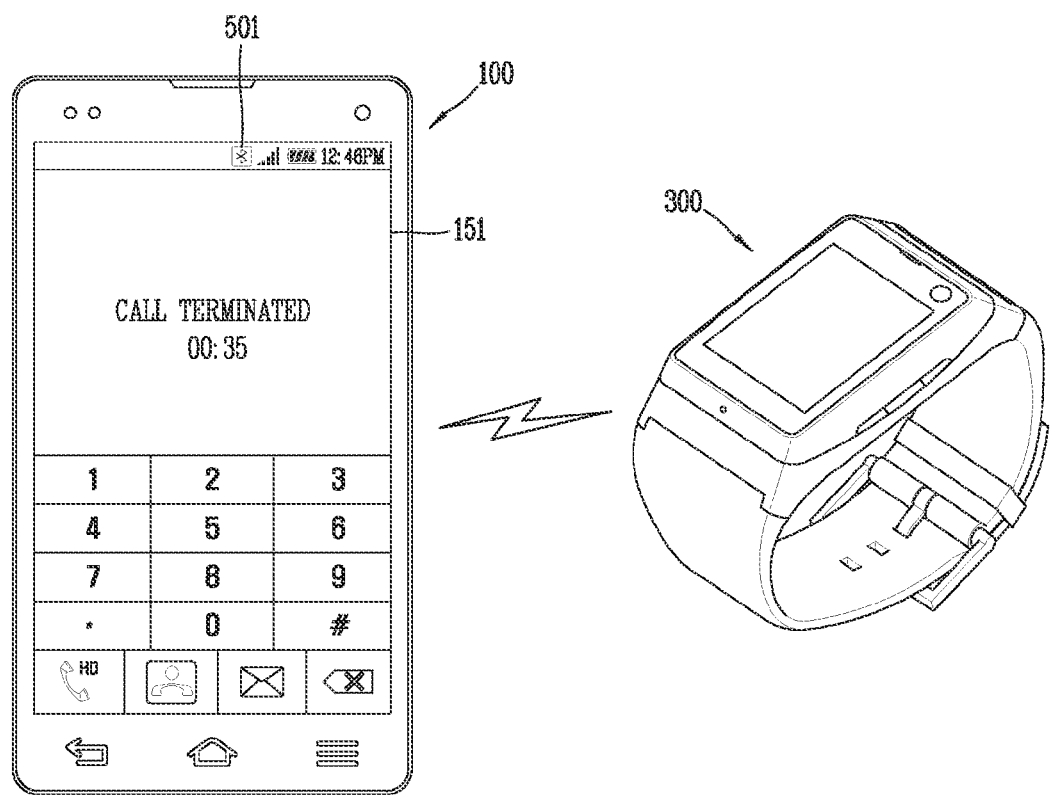

For example, as illustrated in FIG. 5D, when a call performed through the mobile terminal 100 is terminated, a state of wireless communication between the mobile terminal 100 and the external device 300 is returned to the previous state. Also, the second icon 502 representing a connection of a call displayed on the display unit 151 of the mobile terminal 100 disappears and only the first icon 501 representing a state of wireless communication is displayed.

Meanwhile, in another example, in a case in which a call is transferred from the external device 300 to the mobile terminal 100 on the basis of a user's habitual gesture, the controller 180 may release the connection of wireless communication between the mobile terminal 100 and the external device 300 or may change setting such that connection of at least subsequent call is executed by the mobile terminal 100, rather than by the external device 300. In such a case, battery consumption according to wireless communication may be saved.

Also, in a specific example to which an exemplary embodiment of the present disclosure is applicable, a configuration in which a call is transferred from a vehicle hands-free to a mobile terminal, on the basis of a driver's gesture or a passenger's gesture of a vehicle may be taken into consideration.

Figure 9:
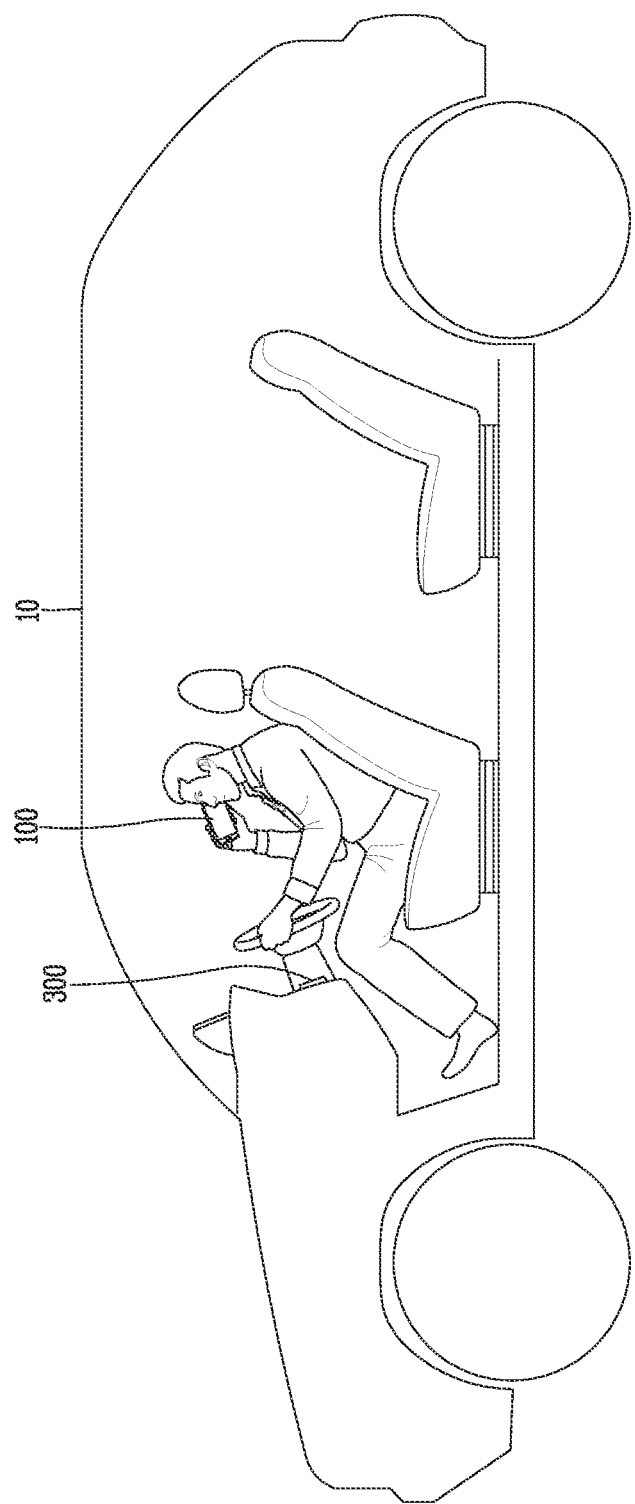
FIG. 9 is a conceptual view illustrating how a call is transferred to a mobile terminal within a vehicle according to an exemplary embodiment of the present disclosure.

In this connection, FIG. 9 is a conceptual view illustrating how a call is transferred to a mobile terminal within a vehicle according to an exemplary embodiment of the present disclosure.

As illustrated in FIG. 9, in a case in which a vehicle Bluetooth hands-free device 300 is installed in a vehicle 10 and connected to the mobile terminal 100 for Bluetooth communication, a call standby signal or a call communication voice is output through a speaker provided in the hands-free device 300.

In this case, when the driver or the passenger makes a gesture of bringing the mobile terminal 100 close to his or her head as described above, a call is immediately transferred from the vehicle Bluetooth hands-free device 300 to the mobile terminal 100. For example, when a call is terminated while a road guidance voice is being output through a navigation device (not shown), the passenger of the vehicle may bring the mobile terminal 100 close to his or her head so that the call is transferred to the mobile terminal 100, whereby a voice corresponding to the termination of the call does not interfere with the road guidance voice.

So far, the method of transferring a call from the external device 100 to the mobile terminal 100 on the basis of a user's habitual gesture has been described. According to the exemplary embodiments of the present disclosure as described above, in a case in which a call is generated during wireless communication with the external device, the call is immediately transferred to the mobile terminal 100 only through the user's habitual gesture, whereby the user does not need to perform an operation of interrupting the call and an operation for changing a connection state.

Hereinafter, a method for controlling a transferred call to be connected back to the external device 100 will be described.

Figure 6:
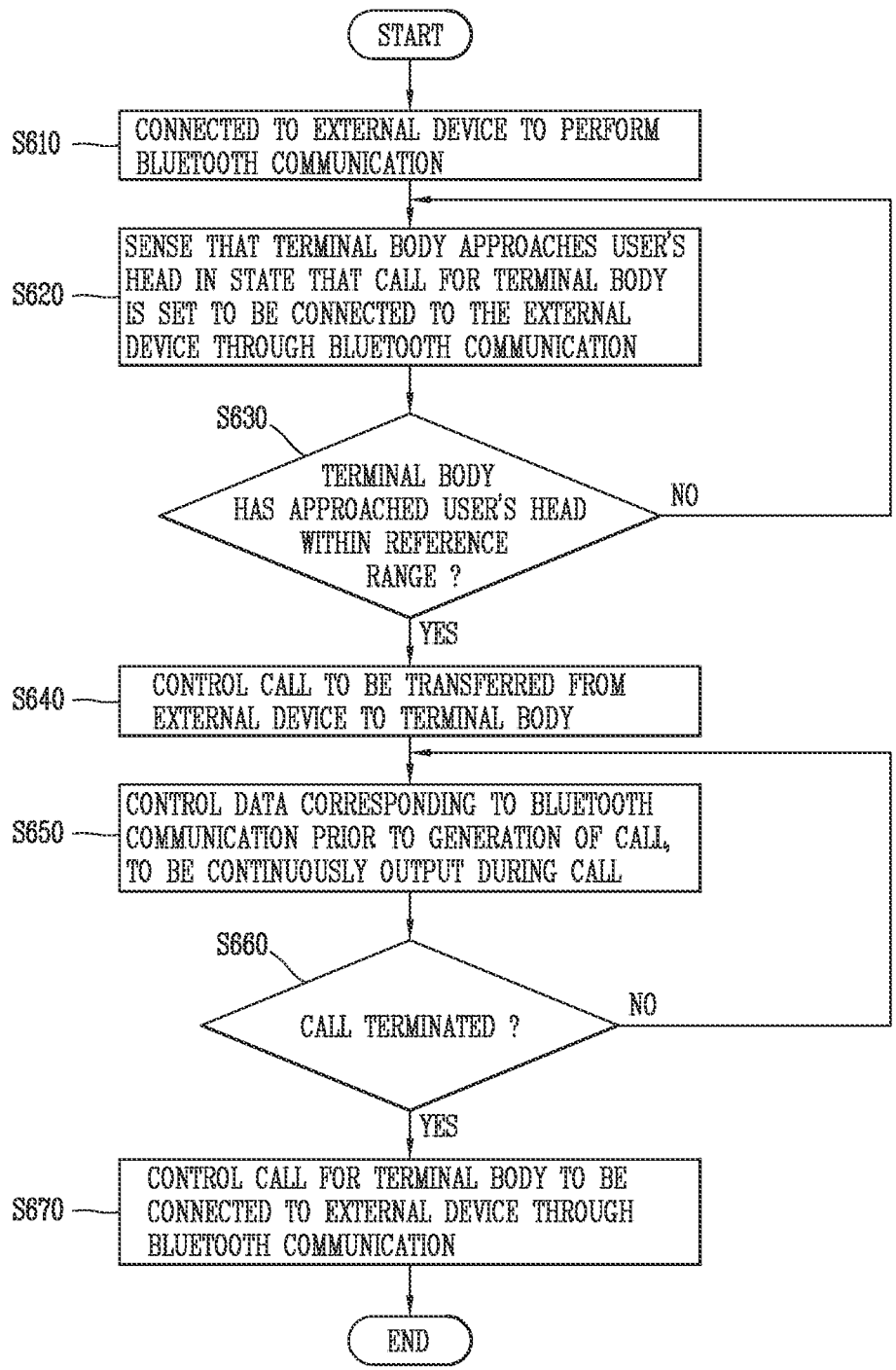
FIG. 6 is a flow chart illustrating a method of connecting a previous call to an external device communicating based on Bluetooth in a mobile terminal according to an exemplary embodiment of the present disclosure.

FIG. 6 is a flow chart illustrating a method of connecting a previous call to an external device communicating based on Bluetooth in a mobile terminal according to an exemplary embodiment of the present disclosure.

As illustrated in FIG. 6, the mobile terminal 100 according to an exemplary embodiment of the present disclosure is connected to at least one external device 300 to perform Bluetooth communication in step S610. Bluetooth communication may be performed, for example, as the mobile terminal 100 broadcasts a search signal to generate a list of external devices 300 available for communication and an external device 300, which has received the search signal, transmits a response signal.

Meanwhile, when a call for the mobile terminal 100 is set to be connected to the external device 300 through Bluetooth communication, the sensing unit 140 of the mobile terminal 100 may subsequently sense that the terminal body approaches the user's head in step S620. Here, setting a call to be connected to the external device 300 refers to setting a call to be terminated to or originated from the external device 300 that wirelessly communicates with the mobile terminal 100.

According to the sensing results, when the body of the mobile terminal 100 has approached the user's head within a reference range in step S630, the controller 180 provides control such that data corresponding to Bluetooth communication generated previously is continuously output by the external device 300 even after the call is transferred in step S650. Namely, only the call is transferred to the mobile terminal 100 and Bluetooth communication corresponding to a different function which has already been executed is continuously executed by the external device 300. In this manner, when only the call is transferred from the external device 300 to the mobile terminal 100, while Bluetooth communication is being continuously maintained, there is no need to release the Bluetooth communication, and thus, the mobile terminal 100 may not need to perform paring on the basis of connection information and paring information that the mobile terminal 100 has retained before releasing of Bluetooth connection to automatically perform connection.

Meanwhile, when the transferred call is terminated in step S660, the mobile terminal 100 may provide control such that a call for the terminal body is automatically connected to the external device 300 as a Bluetooth device in step S670. In this case, as described above, since only a call for the terminal body is transferred to the mobile terminal 100, a paging procedure for re-connecting Bluetooth communication is not required.

Also, when the call is terminated in step S660, the controller 180 may provide control such that an operation corresponding to Bluetooth communication suspended in the external device 300 is resumed. For example, in a case in which a sound corresponding to playing of content stored in the mobile terminal 100 is output through the external device 300, when a call is transferred, playing of the corresponding content is temporarily stopped, and when the call is terminated, the corresponding content may be played starting from a point at which the content was stopped.

According to the exemplary embodiments of the present disclosure described above, in a state in which a call is transferred, a state of wireless communication may be maintained to execute a function excluding the call. Also, when the transferred call is terminated, a call is automatically connected to the external device, whereby wireless communication with the external device is not interfered by the transfer of a call. Thus, there is no need to repeat a procedure for re-connecting a call to the external device after a call is terminated.

Figure 7:
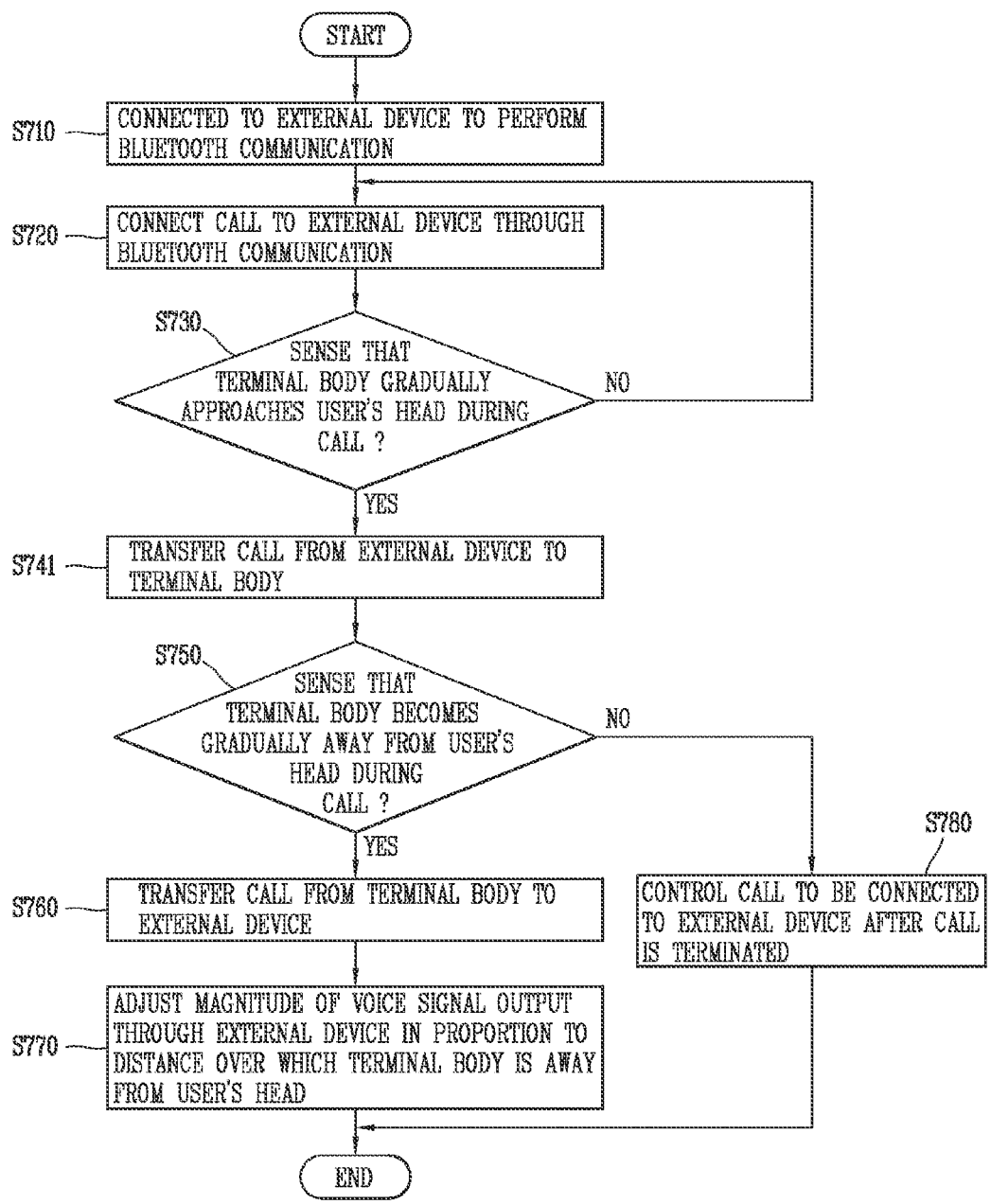
FIG. 7 is a flow chart illustrating a method of transferring a call according to a degree by which the mobile terminal is close to the user's head according to an exemplary embodiment of the present disclosure.

Hereinafter, a method for transferring a call according to a degree by which the mobile terminal approaches the user's head according to an exemplary embodiment of the present disclosure will be described with reference to FIGS. 7 and 8A through 8D. FIG. 7 is a flow chart illustrating a method of transferring a call according to a degree by which the mobile terminal is close to the user's head according to an exemplary embodiment of the present disclosure, and FIGS. 8A through 8D are conceptual views illustrating the flow chart of FIG. 7.

First, as illustrated in FIG. 7, the mobile terminal 100 according to an exemplary embodiment of the present disclosure is connected to at least one external device 300 to perform Bluetooth communication in step S710.

A call is connected to the external device 300 through Bluetooth communication in step S720. Here, the connection of a call includes termination and origination of a call, and also includes a call standby state in which a ring back tone is being output and a state of a call connected to a counterpart.

Meanwhile, in the state in which a call is connected to the external device 300, the sensing unit 140 of the mobile terminal 100 may sense that the terminal body gradually approaches a user's head in step S730. Here, gradually approaching refers to a case in which a difference between a distance (hereinafter, referred to as a 'first distance value') between the mobile terminal 100 and the user's head sensed at a first point in time and a distance (hereinafter, referred to as a 'second distance value') between the mobile terminal 100 and the user's head sensed at a second point in time is reduced. Namely, gradually approaching refers to a case in which the second distance value is smaller than the first distance value.

Figure 8A:
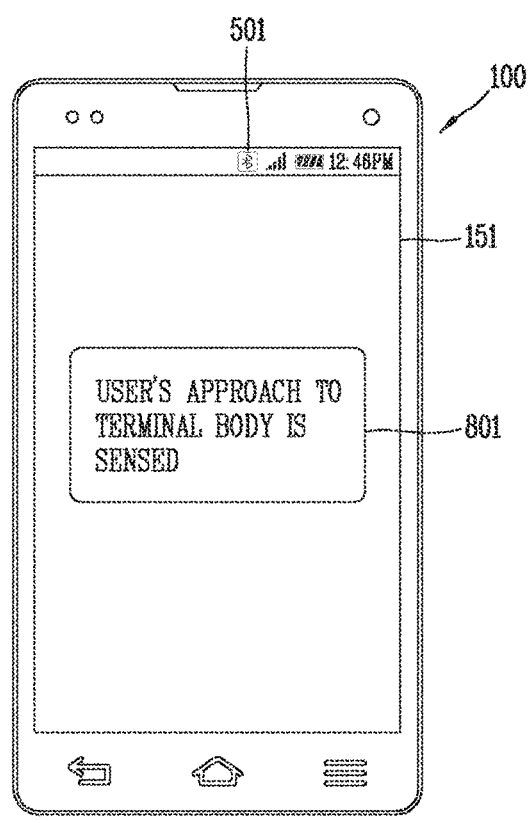
FIGS. 8A through 8D are conceptual views illustrating the flow chart of FIG. 7.

In this manner, when it is sensed that the body of the mobile terminal 100 gradually approaches the user's head, as illustrated in FIG. 8A, a message indicating the approach, for example, a message indicating that 'user access the terminal body is sensed', may be output to the display unit 151 of the mobile terminal 100.

Subsequently, when the body of the mobile terminal 100 has approached the user's head within a reference range, the controller 180 may transfer a call being performed by the external device 300 to the body of the mobile terminal 100 in step S741.

Figure 8B:
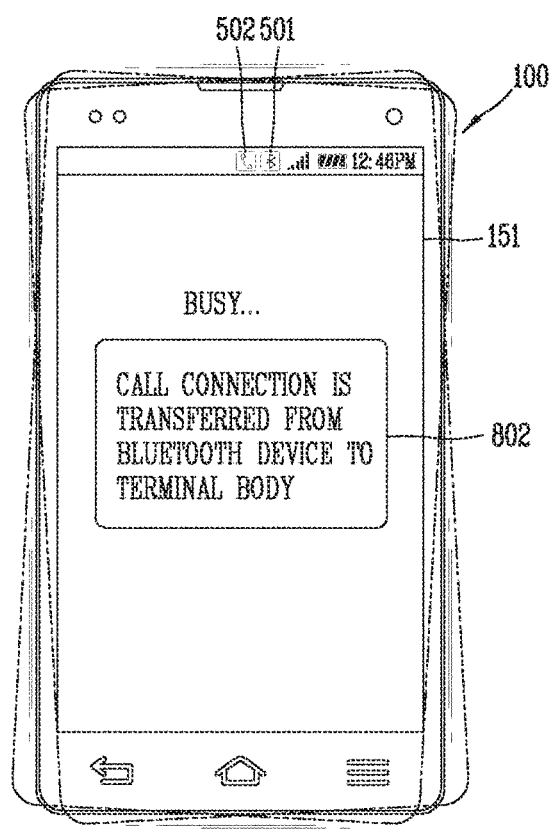

When the call is transferred during call communication, the controller 180 may output first vibration through the output unit 150 of the mobile terminal 100. For example, as illustrated in FIG. 8B, when the call is transferred during call communication, vibration may be output together with a message 802 indicating the transfer of the call, for example, a message such as 'call connection is transferred from Bluetooth device to terminal body'. Meanwhile, although not shown, alarm corresponding to the call transfer may be output in the form of at least one of a sound, vibration, and a message, to the external device 300 from which the call has been transferred.

Meanwhile, even while the call is transferred and being connected, the sensing unit 140 may sense that the body of the mobile terminal 100 becomes gradually away from the user's head during call communication in step S750. Namely, even after the call is transferred, the mobile terminal 100 according to an exemplary embodiment of the present disclosure continuously or periodically senses a distance between the mobile terminal 100 and the user's head or a user gesture corresponding thereto.

According to the sensing results in step S750, when it is sensed that the mobile terminal 100 becomes gradually away from the user's head during call communication, the mobile terminal 100 transfers the call from the mobile terminal 100 back to the external device 300 in step S760.

Figure 8C:
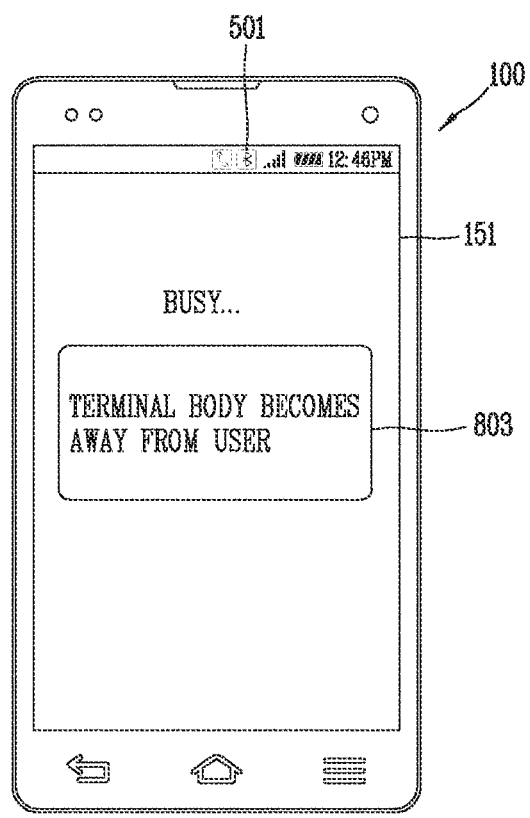

For example, after the call is transferred, when the mobile terminal 100 becomes gradually away from the user's head, as illustrated in FIG. 8C, the controller 180 may output a message indicating the separation, for example, a message such as 'terminal body is away from user', to the display unit 151.

Figure 8D:
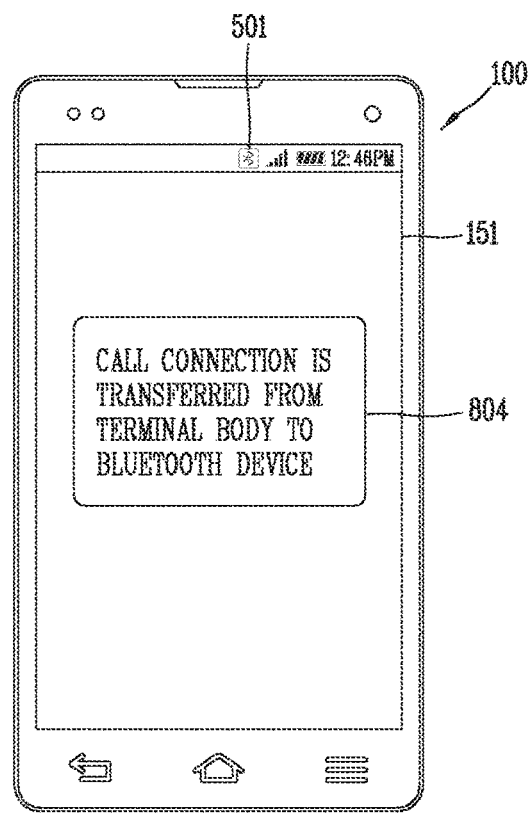

Also, when the call is transferred from the mobile terminal 100 back to the external device 300 beyond a reference range, as illustrated in FIG. 8D, the controller 180 may output a message indicating the transfer of the call, for example, a message such as 'call is transferred from terminal body to Bluetooth device', to the display unit 151. In this case, although not shown, in response to the transfer of the call from the body of the mobile terminal 100 to the external device 300, the controller 180 may output second vibration (identical to or different from the first vibration as described above) through the output unit 150 of the mobile terminal 100.

Also, the controller 180 may adjust a magnitude of a voice signal corresponding to the call output through the external device 300 in proportion to the distance over which the body of the mobile terminal 100 is away from the user's head in step S770.

In detail, in a case in which the mobile terminal 100 becomes gradually away from the user's head beyond a pre-set reference range (for example, a distance between the mobile terminal 100 and the user's head is sufficient to be sensed by the proximity sensor), the controller 180 may gradually increase a magnitude of a voice signal corresponding to the call output to the external device in proportion to the increased distance. Namely, a volume of the voice signal corresponding to the call output to the external device 300 increases as the mobile terminal 100 becomes away from the user's head.

In contrast, in a case in which the mobile terminal 100 is moved beyond the pre-set reference range (for example, a distance between the mobile terminal 100 and the user's head is sufficient to be sensed by the proximity sensor) and subsequently gradually becomes closer to the user's head, the controller 180 may gradually reduce a magnitude of the voice signal corresponding to the call output to the external device 300. Accordingly, when the distance between the mobile terminal 100 and the user's head enters the reference range, the controller 180 transfers the call from the external device to the mobile terminal 100 at the point in time corresponding thereto.

Also, the controller 180 may determine a point in time at which the call is to be transferred, on the basis of time information during which a state in which the body of the mobile terminal 100 has approached the user's head or has been separated from the user's head is maintained. For example, although the body of the mobile terminal 100 has approached the user's head within the predetermined range, only when the approached state is maintained during a pre-set period of time, the controller 180 may transfer the call. Similarly, although the body of the mobile terminal 100 becomes away from the user's head beyond the predetermined range, only when the separated state is maintained during a pre-set period of time, the controller 180 may transfer the call back.

Meanwhile, according to the sensing results in step S750, in a case in which the mobile terminal 100 does not become gradually away from the user's head, the controller 180 of the mobile terminal 100 may provide control such that after the call in the mobile terminal 100 is terminated, a call is connected to the external device 300 in step S780.

Also, although not shown, after a call is transferred on the basis of a user's habitual gesture, when it is determined that the user does not want call connection through the external device any longer, the controller 180 may release the connection for wireless communication between the mobile terminal 100 and the external device 300.

In detail, after the call is transferred to the body of the mobile terminal 100 from the external device 300, when a pre-set period of time has lapsed, the controller 180 determines that the user does not want connection of a call through the external device any longer, and releases the connection for wireless communication between the mobile terminal 100 and the external device 300.

Also, in a case in which the external device 300 is configured to be worn on the user's body, after the call is transferred from the external device 300 to the mobile terminal 100, when wearing of the external device 300 is not sensed during a pre-set period of time, the controller 180 may determine that the user does not want connection of a call through the external device any longer and release the connection for wireless communication between the mobile terminal 100 and the external device 300. In this case, whether the user wears the external device 300 may be recognized by analyzing a biometric signal of the user received from the external device 300, namely, a CG (ElectroCardioGram) signal, a PPG (Photoplethymogram) signal, a GSR (Galvanic Skin Response) signal, or an EMG (electromyogram) signal.

Also, although not shown, according to a call connection state at a point in time at which a call is transferred on the basis of a user's habitual gesture, the controller 180 may control differently a state of connection for wireless communication between the mobile terminal 100 and the external device 300.

To this end, the call as described above may be distinguished into a call in a call mode and a call in a call standby mode according to whether a call is connected.

In detail, when the call is transferred to the terminal body in the call mode and the call is terminated, the controller 180 may provide control such that the state in which a call is set to be connected to the external device 300 is maintained. Also, when the call is transferred to the terminal body in the call standby state and the call is terminated, the controller 180 may provide control such that the state in which a call is set to be connected to the external device 300 is released or the connection for wireless communication between the mobile terminal 100 and the external device 300 is released.

As described above, according to exemplary embodiments of the present disclosure, in a case in which a call is generated during wireless communication with an external device, the call may be immediately transferred to a device the user wants to perform call communication only through a user's habitual gesture, whereby the user does not need to perform an operation of stopping a call and an operation for changing a connection state, increasing user convenience. Also, in a state in which a call is transferred, a state of wireless communication for executing functions, excluding the call, is maintained and when the transferred call is terminated, a call is connected to the external device. Thus, connection with the external device is not interfered with by the call transfer, and thus, there is no need to re-connect the external device after the call is terminated.

In the embodiments of the present invention, the foregoing method may be implemented as codes that can be read by a computer in a program-recorded medium. The computer-readable medium may include any types of recording devices in which data that can be read by a computer system is stored. The computer-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet). Also, the computer may include the controller 180 of the terminal.

The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

What is claimed is:

1. A mobile terminal comprising:
a terminal body;
a wireless communication unit configured to connect an external device to the terminal body to perform wireless communication with the terminal body;
a sensing unit configured to sense that the terminal body approaches a user's head; and
a controller configured to:
set a phone call of the terminal body to be received by the external device through wireless communication when the external device and the terminal body are connected through wireless communication,
sense a distance between the terminal body and the user's head during the phone call being performing by the terminal body,
detect that the phone call of the terminal body is received by the external device and the terminal body approaches the user's head within a reference range during the phone call received by the external device,
only transfer the phone call from the external device to the terminal body while maintaining a state of wireless communication between the external device and the terminal body,
output an alarm in response to transferring the phone call,
control the external device to gradually increase a magnitude of a voice signal of the phone call output to the external device and display a first feedback message to a display unit of the terminal body as the terminal body gradually moves away from the user's head according to the sensing results,
control the external device to gradually reduce the magnitude of the voice signal of the phone call output to the external device and display a second feedback message to the display unit as the terminal body gradually approaches the user's head according to the sensing results, and
set a next phone call of the terminal body to be received by the external device in response to detecting an ending of the phone call being performed by the terminal body.

2. The mobile terminal of claim 1, wherein the wireless communication includes Bluetooth communication or Wi-Fi communication.

3. The mobile terminal of claim 1,
wherein the display unit is configured to output a first icon representing a state of wireless communication between the terminal body and the external device, and
wherein when the phone call is transferred from the external device to the terminal body in a state in which the first icon is output, the controller provides control such that a second icon corresponding to the transfer of the phone call is output to the display unit or the external device.

4. The mobile terminal of claim 1, wherein when the terminal body approaches the user's head within the reference range according to the sensing results, the controller is further configured to:
control the wireless communication unit such that data, of the phone call, corresponding to the wireless communication is continuously output by the external device.

5. The mobile terminal of claim 1, wherein, in a state in which the phone call is set to be received by the external device or after the phone call is transferred from the external device to the terminal body, when wearing of the external device is not sensed for a pre-set period of time, the controller releases the connection between the terminal body and the external device.

6. The mobile terminal of claim 1, wherein the sensing unit senses that the terminal body approaches the user's head, on the basis of image information obtained through a camera.

7. The mobile terminal of claim 1, wherein the sensing unit senses that the terminal body approaches the user's head through a proximity sensor provided in the terminal body.

8. The mobile terminal of claim 1, wherein when the phone call is transferred from the external device to the terminal body, the controller controls an output unit of the terminal body to output first vibration, and
after the first vibration is output, when the phone call is transferred back from the terminal body to the external device, the controller controls the output unit to output second vibration.

9. The mobile terminal of claim 1, wherein the controller is configured to set the next phone call of the terminal body by classifying the phone call into a call in a call mode or a call in a call standby mode,
wherein, when the phone call is transferred from the external device to the terminal body in the call mode and the phone call is ended, the controller maintains the state in which the next phone call is set to be received by the external device, and
wherein, when the phone call is transferred from the external device to the terminal body in the call standby mode and the phone call is ended, the controller controls the wireless communication unit to release the state in which the external device is set to receive the next phone call.

10. A method for controlling a mobile terminal, the method comprising:
connecting the mobile terminal and an external device such that the mobile terminal and the external device perform wireless communication;
setting a phone call of the mobile terminal to be received by the external device through wireless communication when the external device and the mobile terminal are connected through wireless communication;
sensing a distance between the terminal body and the user's head during the phone call being performing by the terminal body;
detecting that the phone call of the mobile terminal is received by the external device and the mobile terminal approaches the user's head within a reference range during the phone call received by the external device;
only transferring the phone call from the external device to the mobile terminal while maintaining a state of wireless communication between the external device and the terminal body,
outputting an alarm in response to transferring the phone call;
controlling the external device to gradually increase a magnitude of a voice signal of the phone call output to the external device and displaying a first feedback message to a display unit of the terminal body as the terminal body gradually moves away from the user's head according to the sensing results;
controlling the external device to gradually reduce the magnitude of the voice signal of the phone call output to the external device and displaying a second feedback message to the display unit as the terminal body gradually approaches the user's head according to the sensing results; and
setting a next phone call of the terminal body to be received by the external device in response to detecting an ending of the phone call being performed by the terminal body.

11. The method of claim 10, wherein the wireless communication includes at least one of Bluetooth communication and Wi-Fi communication.

12. The method of claim 10, further comprising:
providing control such that data, of the phone call, corresponding to the wireless communication is continuously output by the external device.

* * * * *